US009753053B2

(12) United States Patent
Masucci

(10) Patent No.: US 9,753,053 B2
(45) Date of Patent: Sep. 5, 2017

(54) WIND VELOCITY SENSOR FOR A VEHICLE

(71) Applicant: Deere & Company, Moline, IL (US)

(72) Inventor: Christopher M. Masucci, Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 88 days.

(21) Appl. No.: 14/718,617

(22) Filed: May 21, 2015

(65) Prior Publication Data

US 2016/0341757 A1    Nov. 24, 2016

(51) Int. Cl.
*G01P 5/24*    (2006.01)

(52) U.S. Cl.
CPC .................... *G01P 5/245* (2013.01)

(58) Field of Classification Search
USPC ....................................................... 73/170.13
See application file for complete search history.

(56) References Cited

U.S. PATENT DOCUMENTS

| | | | |
|---|---|---|---|
| 4,890,488 | A | 1/1990 | Pincent et al. |
| 5,343,744 | A | 9/1994 | Ammann |
| 5,877,416 | A | 3/1999 | Kapartis |
| 6,370,949 | B1 | 4/2002 | Zysko et al. |
| 7,269,537 | B1 | 9/2007 | Mattern |
| 2015/0016223 | A1* | 1/2015 | Dickinson ............... G06F 3/043 367/87 |

FOREIGN PATENT DOCUMENTS

| | | | |
|---|---|---|---|
| JP | 2005249565 A | 9/2005 | |
| JP | 2014224719 A | * 12/2014 | .............. G01P 13/00 |

OTHER PUBLICATIONS

Acu-Res® Technology. Product webpage [online]. FT Technologies Ltd., 2015 [retrieved on May 21, 2015]. Retrieved from the Internet: <http://www.fttech.co.uk/acu-res-technology>.
Series VTT Air Velocity/Temperature Transmitter. Product webpage [online]. Dwyer Instruments, Inc., 2015 [retrieved on May 21, 2015]. Retrieved from the Internet: <http://www.dwyer-inst.com/ApplicationGuides/?ID=29>.
PB200 WeatherStation® Instrument. Product brochure [online]. Airmar Technology Corporation, 2011 [retrieved on May 21, 2015]. Retrieved from the Internet: <http://www.airmartechnology.com/uploads/brochures/pb200.pdf>.
Magellan™ Weather Stations. Product brochure [online]. Columbia Weather Systems, Inc., 2015 [retrieved on May 21, 2015]. Retrieved from the Internet: <http://columbiaweather.com/media/products/Magellan/Brochure-Magellan8x11.pdf>.
WindSonic™ Wind Speed & Direction Sensor. Product datasheet [online]. Gill Instruments, 2013 [retrieved on May 21, 2015]. Retrieved from the Internet: <http://gillinstruments.com/data/datasheets/windsonic.pdf?iss=3.20150501>.

(Continued)

*Primary Examiner* — Laura Martin
*Assistant Examiner* — Jean Morello

(57) ABSTRACT

A wind velocity sensor comprises a lower platform and an upper platform. Pillars are positioned or connected between the upper platform and the lower platform. Ultrasonic sensors are secured to corresponding ones of the pillars. A lower guard member extends outwardly from a reference ultrasonic sensor by a radial distance greater than a radial separation between any pair of the ultrasonic sensors.

17 Claims, 3 Drawing Sheets

(56) References Cited

OTHER PUBLICATIONS

"FT7 Series wind sensors—Powered by Acoustic Resonance Technology." FT Technologies, May 18, 2015 [online video], [retrieved Aug. 30, 2016]. Retrieved from the Internet: < URL:https://www.youtube.com/watch?v=UmOExAMyZag>.
The International Search Report and the Written Opinion of the International Searching Authority issued in counterpart application No. PCT/US16/032971, dated Aug. 30, 2016 (6 pages).

* cited by examiner

WIND VELOCITY SENSOR FOR A VEHICLE

FIELD OF DISCLOSURE

This disclosure relates to a wind velocity sensor for a vehicle.

BACKGROUND ART

Prior art wind velocity sensors can be mounted on vehicles to estimate wind velocity. However, certain prior art wind sensors exhibit significant measuring error when an off-road vehicle moves in a work area or field. Thus, there is a need to improve performance of the wind sensor to reduce measurement error from vehicle movement.

SUMMARY

In accordance with one embodiment, a wind velocity sensor comprises a lower platform and an upper platform. Pillars are positioned or connected between the upper platform and the lower platform. Ultrasonic sensors are secured to corresponding ones of the pillars. A lower guard member extends outwardly from a reference ultrasonic sensor by a radial distance greater than a radial separation between any pair of the ultrasonic sensors.

DETAILED DESCRIPTION OF EMBODIMENTS

Figure 1:
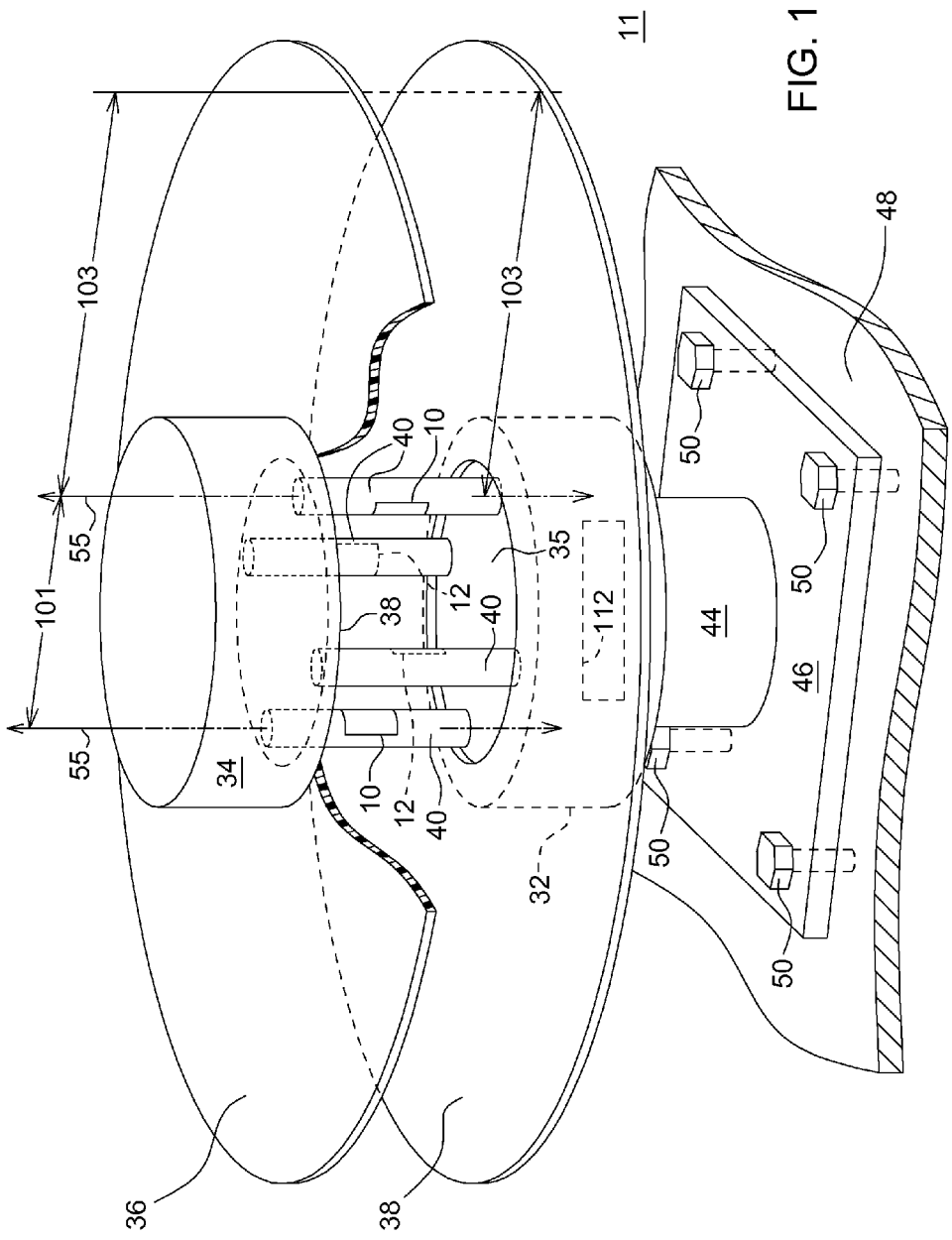
FIG. 1 is a perspective view of a first embodiment of the wind velocity sensor.

In accordance with one embodiment, a wind velocity sensor 11 comprises a lower platform 32 and an upper platform 34. Pillars 40 are positioned or connected between the upper platform 34 and the lower platform 32. Ultrasonic sensors (10, 12) are secured to corresponding ones of the pillars 40. A lower guard member 38 extends outwardly from a reference ultrasonic sensor 10 by a radial distance 103 greater than a radial separation 101 between any pair of the ultrasonic sensors (10, 12). In the absence of the lower guard member 38, the upper guard member 36, or both, turbulence created by the vehicle's irregular shape can distort or change the airflow detected by one or more ultrasonic sensors (10, 12), which can cause it or them to read inaccurate wind velocity, including the wind direction, the magnitude of the wind speed, or both. The lower guard member 38 is positioned below the ultrasonic sensors (10, 12) and the upper guard member 36 is positioned above the ultrasonic sensor to straighten and guide the airflow detected by one or more sensors (10, 12), while deflecting turbulence from above or below the guard members (36, 38).

In one embodiment, a lower platform 32 comprises a substantially cylindrical structure, a substantially polygonal structure, or substantially rectangular structure. In one embodiment, the upper platform 34 comprises a substantially cylindrical structure, a substantially polygonal structure, or substantially rectangular structure. Either the lower platform 32 or the upper platform 34 may be formed by joining a first housing member and a second housing member to house an electronics assembly 112, save the ultrasonic sensors (10, 12). For illustrative purposes, electronics assembly 112 is illustrated in dashed or phantom lines in FIG. 1 within the lower platform 32, although other embodiments can fall within the scope of the appended claims. The electronics assembly 112 is described in more detail in conjunction with FIG. 3.

A set pillars 40 are positioned between or connected to the upper platform 34 and the lower platform 32. Although the pillars 40 are shown with a substantially circular cross section, each pillar may have any cross-sectional shape such as substantially elliptical, rectangular, triangular, or otherwise. As shown in FIG. 1, each pillar 40 has a notch or recess (e.g., semi-cylindrical notch) for receiving or mounting a corresponding ultrasonic sensor within the notch or recess.

The ultrasonic sensors (10, 12) are secured to corresponding ones of the pillars 40 by fasteners, a snap-fit connection, or adhesive bonding, for example. At least two ultrasonic sensors 10 are required to provide an estimate wind velocity, although three or more ultrasonic sensors (10, 12) can provide more accurate estimates. Ultrasonic sensors 12 are shown as dashed lines in FIG. 1, FIG. 2 and FIG. 3 because the ultrasonic sensors are optional.

In one embodiment, a lower guard member 38 extends outwardly by a radial distance 103 that is substantially equal to the radial distance 103 of the upper guard member 36. In another embodiment, the lower guard member 38 extends outwardly from a reference ultrasonic sensor 10 (or any arbitrary ultrasonic sensor) by greater radial distance 103 than a radial separation 101 between any pair of the ultrasonic sensors (10, 12). Similarly, in certain embodiments, the upper guard member 36 extends outwardly from an ultrasonic sensor (10, 12) by a radial distance 103 greater than a radial separation 101 between any pair of the ultrasonic sensors (10, 12). If the ultrasonic sensor is co-located with a pillar 40, the radial distance 103 and the radial separation 101 may be measured from a central vertical axis 55 of each pillar 40, for example.

The upper guard member 36 and the lower guard member 38 may have virtually any perimeter shape (e.g., curved, circular, elliptical, ring-shaped, scalloped, or polygonal) so long as the upper guard member 36 and the lower guard member 38 are substantially planar or generally flat. As illustrated, in FIG. 1, the upper guard member 36 is substantially annular and substantially planar. Similarly, the lower guard member 38 is substantially annular and substantially planar. In certain embodiments, the upper guard member 36 may be referred to as a disc or disc-shaped member; the lower guard member 38 may be referred to as a disc or disc-shaped member.

In one embodiment, the upper guard member 36 is secured to at least a portion of a lower surface 38 of the upper platform 34. For example, the upper guard member 36 is adhesively bonded to at least a portion (e.g., an outer ring surface) of the lower surface 38 of the upper platform 34. In certain embodiments, the lower guard member 38 is secured to at least a portion of an upper surface 35 (e.g., an outer ring surface) of the lower platform 32. For example, the lower guard member 38 is adhesively bonded to at least a portion of the lower surface 35 of the upper platform 34.

The wind velocity sensor 11 is capable of mounting on a vehicle or implement, or a stationary structure. The wind velocity sensor 11 is well suited for mounting on agricultural, construction, forestry and other off-road work vehicles, or its or their associated implements. One end of a support shaft 44 is connected to the lower platform 32 and an opposite end of the support shaft has a flange 46 for connection to the vehicle, implement, or other structure 48 via one or more fasteners 50.

Figure 2:
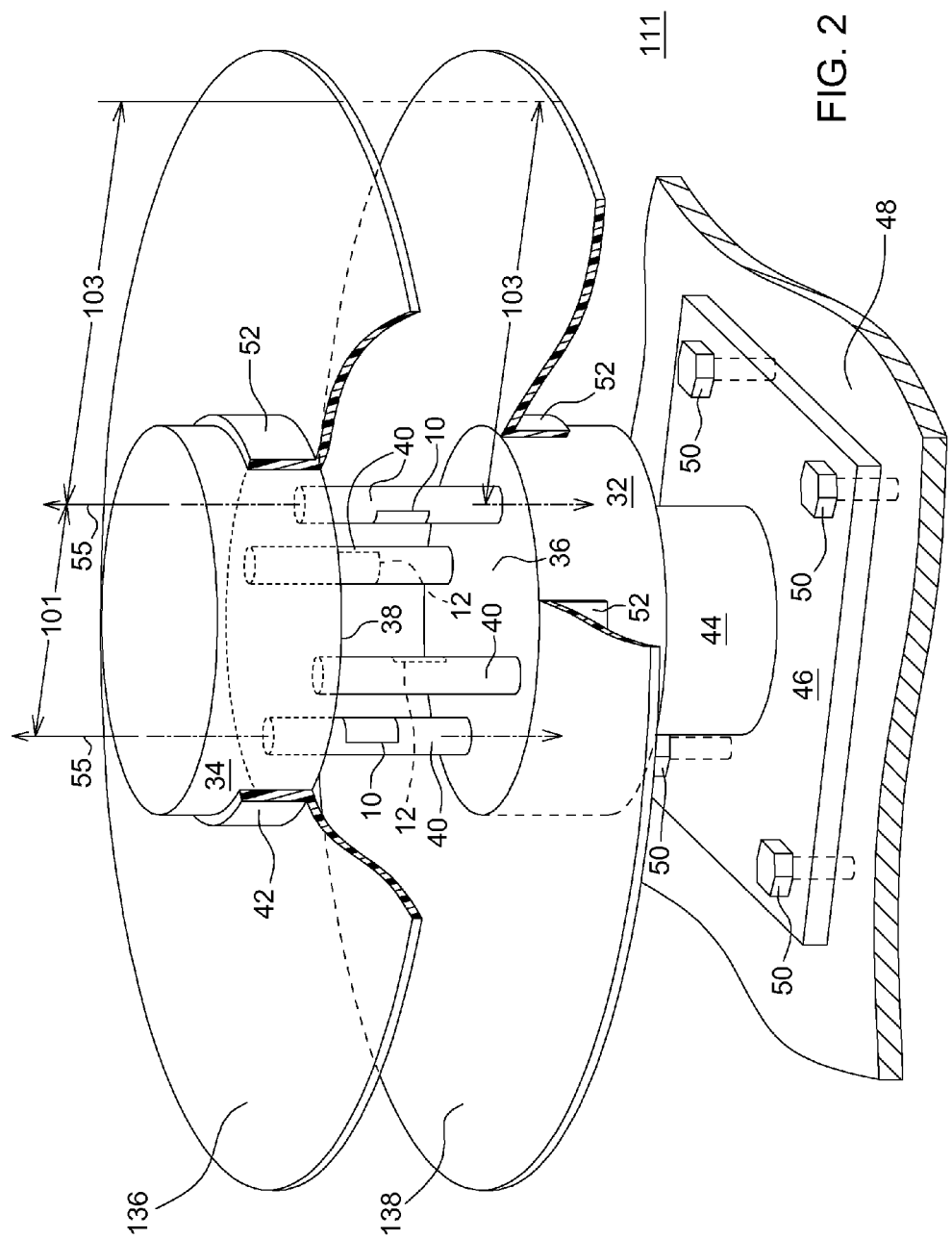
FIG. 2 is a perspective view of a second embodiment of the wind velocity sensor.

The wind velocity sensor 111 of FIG. 2 is similar to the wind velocity sensor 11 of FIG. 1, except in FIG. 2 each of the upper guard member 136 and the lower guard member 138 has a shoulder, collar or hub. Like elements in FIG. 1 and FIG. 2 are indicated by like reference numbers.

In FIG. 2, the upper guard member 136 has a shoulder, collar or hub 52 for mating with an outer perimeter of the upper platform 34 and the lower guard member 138 has a shoulder, collar or hub 52 for mating with an outer perimeter of the lower platform 32.

In certain embodiments, the shoulder, collar or hub 52 is press-fitted onto the outer perimeter of the upper platform 34 to secure the upper guard member 136 to the upper platform 34. Similarly, the shoulder, collar or hub 52 is press-fitted onto the outer perimeter of the lower platform 32 to secure the upper guard member 136 to the lower platform 32.

In an alternate embodiment, the shoulder, collar or hub 52 of the lower guard member 138 or the upper guard member 136 may be adhesively bonded, welded, or fastened (with fasteners) to the lower guard platform or the upper guard platform, respectively.

Figure 3:
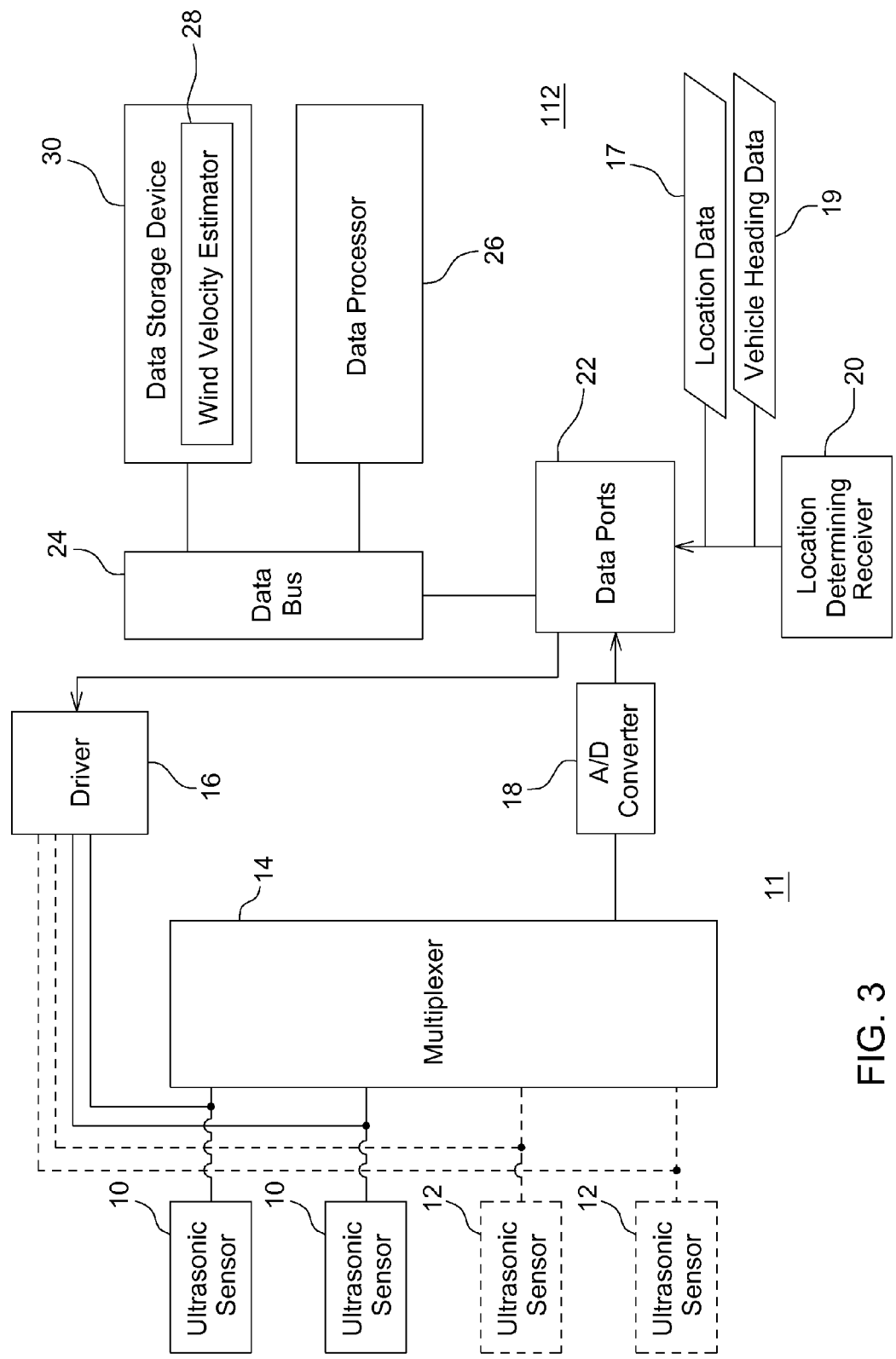
FIG. 3 is a block diagram of a the electronic assembly of the wind velocity sensor of FIG. 1 or FIG. 2.

In FIG. 3, the lower platform 32, the upper platform 34, or both may comprise an electronics enclosure with a first enclosure portion and a mating second enclosure portion that encloses the electronic assembly 112 illustrated in the block diagram. For example, the first enclosure may nest with the second enclosure portion, or the first enclosure portion may comprise a lid for mounting on a container that embodies the second enclosure portion. The electronics assembly 112 has one or more ultrasonic sensors (10, 12) that are arranged to sense or detect wind velocity. For example, the ultrasonic sensors (10, 12) are positioned in association with corresponding pillars 40 as illustrated in FIG. 1 or FIG. 2, for example.

Each ultrasonic sensor (10, 12) comprises an ultrasonic transducer that has sensor terminals. A driver 16 is coupled to the sensor terminals to drive the ultrasonic sensor (10, 12) to produce or transmit a sound pulse or noise pulse at the transmission time. Each ultrasonic sensor (10, 12) can generate or transmit a sound pulse or noise pulse within a measurement frequency band (e.g., approximately 150 Hz to approximately 450 kHz).

Each ultrasonic sensor (10, 12) can receive, detect or sense a sound pulse or noise pulse within a measurement frequency band (e.g., approximately 150 Hz to approximately 450 kHz). Input terminals of the multiplexer 14 are coupled to the sensor terminals of one or more ultrasonic sensors (10, 12). On a time-multiplexed basis, the multiplexer 14 receives received signals that contain reception time measurements and other signal parameters (e.g., magnitude and frequency shift) of sound pulses from one or more ultrasonic sensors (10, 12). The multiplexer 14 output is fed to an analog-to-digital converter 18 that receives signals from one or more of the ultrasonic sensors (10, 12) via the multiplexer 14.

An electronic data processor 26 comprises a microcontroller, a microprocessor, a programmable gate array, an application specific integrated circuit, a digital signal processor, or another data processor for storing, retrieving, manipulating or processing data. The data processor 26 is coupled to a data bus 24. In turn, the data bus 24 is connected to one or more data ports 22 and a data storage device 30.

The data storage device 30 comprises an electronic memory, nonvolatile random access memory, a magnetic storage device, an optical storage device, a hard disc drive, or the like. The data storage device 30 may store software or instructions that can be executed by the data processor 26. For example, the data storage device 30 may storage a wind velocity estimator 28.

The data processor 26 or wind velocity estimator 28 reads reception time measurements and other signal parameters (e.g., magnitude or frequency shift) of sound pulses from one or more ultrasonic sensors (10, 12) on a time-slot multiplexed basis. The data processor 26 or wind velocity estimator 28 determines a time difference between a transmission time of the sound pulse from one ultrasonic sensor (10, 12) and reception time of the transmitted noise pulse at the other ultrasonic sensors (10, 12) provides an indication of wind velocity, including wind direction and wind speed. The wind direction requires the wind sensor (11, 111) to be oriented with a known direction to North heading or that the vehicle heading is known for a vehicle-mounted wind velocity sensor (11 or 111).

In one embodiment, a location-determining receiver 20 (e.g., a satellite navigation receiver) may provide location data 17, heading data 19, or both to the data processor 26 such that the data processor 26 can compensate for a vehicle movement vector. For example, the data processor 26 can subtract the vehicle movement vector from an estimated wind velocity vector, to negate the effect of the vehicle heading on the orientation to North of the wind velocity sensor (11 or 111).

In one embodiment, the data processor 26 or wind velocity estimator 28 is programmed or arranged to process the received signals to provide an estimate of the wind velocity vector based on the measurements from the ultrasonic sensors (10, 12) and the location data 17 and heading data 19 from the location-determining receiver 20. The data processor 26 can measure the transmission time of sound pulses, the corresponding reception time of the transmitted sound pulses at one or more ultrasonic sensors (10, 12), and the magnitude or other signal parameters.

Having described on or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A wind velocity sensor comprising:
   a lower platform;
   an upper platform;
   a plurality of pillars between and connected to the upper platform and the lower platform;
   a plurality of ultrasonic sensors secured to corresponding ones of the pillars;
   a lower guard member extending outwardly from one of the ultrasonic sensors by a radial distance greater than a radial separation between any pair of the ultrasonic sensors.

2. The wind sensor according to claim 1 further comprising an upper guard member extending outwardly from one of the ultrasonic sensors by a radial distance greater than a radial separation between any pair of the ultrasonic sensors.

3. The wind sensor according to claim 2 wherein the upper guard member is substantially annular and substantially planar.

4. The wind sensor according to claim 2 wherein the upper guard member is secured to at least a portion of a lower surface of the upper platform.

5. The wind sensor according to claim 2 wherein the upper guard member is adhesively bonded to at least a portion of the lower surface of the upper platform.

6. The wind sensor according to claim 2 wherein the upper guard member has a shoulder, collar or hub for mating with an outer perimeter of the upper platform.

7. The wind sensor according to claim 6 wherein the shoulder, collar or hub has a press-fitted connection onto the outer perimeter of the upper platform.

8. The wind sensor according to claim 1 wherein the lower guard member is substantially annular and substantially planar.

9. The wind sensor according to claim 1 wherein the lower guard member is secured to at least a portion of an upper surface of the lower platform.

10. The wind sensor according to claim 1 wherein the lower guard member is adhesively bonded to at least a portion of the upper surface of the lower platform.

11. The wind sensor according to claim 1 wherein the lower guard member has a shoulder, collar or hub for mating with an outer perimeter of the lower platform.

12. The wind sensor according to claim 6 wherein the shoulder or hub has a press-fitted connection onto the outer perimeter of the upper platform.

13. The wind sensor according to claim 1 wherein the wind sensor is mounted on a vehicle or an implement.

14. The wind velocity sensor according to claim 1 wherein the lower guard member extends outwardly by a radial distance greater than the upper platform.

15. A wind sensor comprising:
a lower platform;
an upper platform;
a plurality of pillars between the upper platform and the lower platform;
a plurality of ultrasonic sensors secured to corresponding ones of the pillars, each ultrasonic sensor having sensor terminals;
a lower guard member extending outwardly from one of the ultrasonic sensors by a radial distance greater than a radial separation between any pair of the ultrasonic sensors; wherein the lower platform comprises an electronics enclosure that encloses the following:
a multiplexer coupled to the sensor terminals;
a driver coupled to the sensor terminals;
an analog-to-digital converter receiving signals from one or more of the ultrasonic sensors via the multiplexer;
a data processor for processing the received signals to provide an estimate of the wind velocity vector.

16. The wind sensor according to claim 15 further comprising a location-determining receiver for providing location data to the data processor such that the data processor can remove a vehicle movement vector from the estimated wind velocity vector, the vehicle movement vector based on vehicle heading, vehicle speed, or both.

17. The wind sensor according to claim 15 wherein the lower guard member extends outwardly by a radial distance greater than the upper platform.

\* \* \* \* \*